(12) United States Patent
Bloembergen (10) Patent No.: US 9,157,187 B2
(45) Date of Patent: Oct. 13, 2015

(54) METHODS OF USING BIOBASED LATEX BINDERS FOR IMPROVED PRINTING PERFORMANCE

(75) Inventor: Steven Bloembergen, Okemos, MI (US)

(73) Assignee: ECOSYNTHETIX LTD., Lansing, MI (US)

( * ) Notice: Subject to any disclaimer, the term of this patent is extended or adjusted under 35 U.S.C. 154(b) by 0 days.

(21) Appl. No.: 13/514,635

(22) PCT Filed: Dec. 17, 2010

(86) PCT No.: PCT/US2010/061052
§ 371 (c)(1),
(2), (4) Date: Jun. 8, 2012

(87) PCT Pub. No.: WO2011/084692
PCT Pub. Date: Jul. 14, 2011

(65) Prior Publication Data
US 2012/0263894 A1    Oct. 18, 2012

Related U.S. Application Data

(60) Provisional application No. 61/288,722, filed on Dec. 21, 2009.

(51) Int. Cl.
*B41J 2/01*    (2006.01)
*D21H 19/54*   (2006.01)
(Continued)

(52) U.S. Cl.
CPC .............. *D21H 19/54* (2013.01); *B41J 2/2107* (2013.01); *C09D 103/02* (2013.01);
(Continued)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .............. 347/105, 101, 100, 96, 95; 428/195, 428/32.1; 106/31.6, 31.27, 31.13
See application file for complete search history.

(56) References Cited

U.S. PATENT DOCUMENTS 4,154,899 A    5/1979  Hershey et al.
4,198,471 A    4/1980  Nelson
(Continued)

FOREIGN PATENT DOCUMENTS

WO    0069916      11/2000
WO    2005/042650   5/2005
(Continued)

OTHER PUBLICATIONS van Leeuwen, J., "Paper Coating—SBR Latex Replacement Technology", 2006 TAPPI Coating and Graphic Arts Conference, Atlanta, GA., Apr. 2006.
(Continued)

*Primary Examiner* — Manish S Shah
(74) *Attorney, Agent, or Firm* — Scott Pundsack; Borden Ladner Gervais LLP (57) ABSTRACT

The invention therefore provides a method of improving print performance in a paper product including applying a coating composition having (i) a pigment and (ii) a starch dispersion of discrete crosslinked native starch particles in an aqueous liquid, wherein the particle size of the starch particles in the starch dispersion ranges from about 40 nm to about 400 μm, to the paper product, wherein the print performance of the paper product is improved. In one embodiment, the coating composition includes a solids content of from 5 to about 75% weight and includes (i) about 100 parts by weight of pigment, and (ii) about 1 to about 300 parts by weight of starch, all based on dry weight.

8 Claims, 5 Drawing Sheets

(51) Int. Cl.
*B41J 2/21* (2006.01)
*D21H 17/28* (2006.01)
*C09D 103/02* (2006.01)
*C09D 109/04* (2006.01)
*C09D 109/08* (2006.01)
*D21H 19/48* (2006.01)

(52) U.S. Cl.
CPC .......... *C09D 109/04* (2013.01); *C09D 109/08* (2013.01); *D21H 17/28* (2013.01); *D21H 19/48* (2013.01); *Y10T 428/25* (2015.01)

(56) References Cited

U.S. PATENT DOCUMENTS

| | | | |
|---|---|---|---|
| 5,755,871 | A | 5/1998 | Husson, Sr. |
| 5,902,453 | A | 5/1999 | Ruch |
| 6,231,970 | B1 | 5/2001 | Anderson et al. |
| 6,290,814 | B1 * | 9/2001 | Rooff et al. ............... 106/205.01 |
| 6,300,393 | B1 | 10/2001 | Hudson et al. |
| 6,667,836 | B2 | 12/2003 | Neil |
| 6,677,386 | B1 * | 1/2004 | Giezen et al. ............... 106/206.1 |
| 6,818,686 | B1 * | 11/2004 | Colpaert et al. ................. 524/17 |
| 6,825,252 | B2 | 11/2004 | Helbling et al. |
| 7,008,979 | B2 | 3/2006 | Schottman et al. |
| 7,160,420 | B2 | 1/2007 | Helbling et al. |
| 7,285,182 | B2 | 10/2007 | Mason et al. |
| 7,285,586 | B2 | 10/2007 | Helbling et al. |
| 7,575,802 | B2 | 8/2009 | Chatani et al. |
| 2001/0026869 | A1 * | 10/2001 | Wicher et al. ................. 428/330 |
| 2003/0048346 | A1 * | 3/2003 | Chow ............................. 347/106 |
| 2004/0014844 | A1 * | 1/2004 | Helbling et al. ................. 524/47 |
| 2004/0089433 | A1 | 5/2004 | Propst et al. |
| 2004/0241382 | A1 * | 12/2004 | Bloembergen et al. ......... 428/72 |
| 2005/0061203 | A1 * | 3/2005 | Helbling et al. ........... 106/145.1 |
| 2005/0119391 | A1 | 6/2005 | Mason et al. |
| 2005/0282026 | A1 * | 12/2005 | Wuu et al. ..................... 428/500 |
| 2006/0042768 | A1 | 3/2006 | Brown et al. |
| 2009/0017234 | A1 | 1/2009 | Song et al. |
| 2011/0042841 | A1 | 2/2011 | Wildi et al. |
| 2011/0171385 | A1 | 7/2011 | Pal et al. |
| 2012/0154502 | A1 * | 6/2012 | Romano et al. ............... 347/105 |
| 2012/0212555 | A1 * | 8/2012 | Romano, Jr. .................. 347/106 |

FOREIGN PATENT DOCUMENTS

| | | |
|---|---|---|
| WO | WO 2011/084692 | 7/2011 |
| WO | 2012/062967 | 5/2012 |
| WO | WO 2012/057732 | 5/2012 |

OTHER PUBLICATIONS

Klass, C. P., New Nanoparticle Latex offers Natural Advantage, Paper360° Magazine, p. 30-31, Jan. 2007.

Bloembergen et al. "Ongoing Developments in Biolatex Binders with a Very Low Carbon Footprint for Paper and Board Manufacturing", 64th Appita Annual Conference & Exhibition, Melbourne, Australia, Apr. 19-21, 2010.

Bloembergen et al. "Paper Binder Performance with Nanoparticle Biolatex TM: EcoSynthetix develops EcoSphere® biolatex for replacement of petroleum based latex binders", ACFS, Montreal, Jun. 11-13, 2008.

Bloembergen et al. "Paper binder performance with biobased nanoparticles. A starch-based biolatex can replace petroleum-based latex binders in papermaking", Paper360° Magazine, 46-48, Sep. 2008.

Bloembergen et al. "Specialty Biobased Monomers and Emulsion Polymers Derived from Starch", PTS Advanced Coating Fundamentals Symposium, Munich, Oct. 11-14, 2010.

Figliolino, F.C. and Rosso, F., "Reducing Carbon Footprint with Biolatex", Paper360° Magazine, Aug. 25-28, 2009.

Oh et al. "Biopolymer-based microgelsianogels for drug delivery applications", Progress in Polymer Science 34, 1261-1282, 2009.

Lee et al. "Development of New Biobased Emulsion Binders", PaperCon2010 Meeting, "Talent, Technology and Transformation", Atlanta, GA, May 2-5, 2010.

* cited by examiner

METHODS OF USING BIOBASED LATEX BINDERS FOR IMPROVED PRINTING PERFORMANCE

CROSS REFERENCE TO RELATED APPLICATIONS

This application is a national phase entry of PCT/US2010/061052, filed Dec. 17, 2010 and claims the benefit of U.S. Provisional Application No. 61/288,722 filed on Dec. 21, 2009. The entirety of U.S. Provisional Application No. 61/288,722 filed on Dec. 21, 2009 is hereby incorporated by reference herein for all purposes. The present invention is also directed to uses of biopolymer compositions such as those described in U.S. Pat. No. 6,677,386 (which corresponds to WO 00/69916) to Giezen et al., filed Jan. 25, 1999, the entirety of which is hereby incorporated by reference herein for all purposes.

STATEMENT REGARDING FEDERALLY SPONSORED RESEARCH OR DEVELOPMENT

Not Applicable.

BACKGROUND

Multiple disclosures have been made regarding the composition and use of various forms of biopolymer nanoparticles. For instance, U.S. Pat. No. 6,677,386 (which corresponds to WO 00/69916) describes a process for producing biopolymer nanoparticles, which in one form are starch nanoparticles. In the process, the biopolymer is plasticized using shear forces, and a crosslinking agent is added during the processing. After the processing, the biopolymer nanoparticles can be dispersed in an aqueous medium. One version of the process results in starch nanoparticles which are characterized by an average particle size of less than 400 nanometers. The nanoparticles can be used as a matrix material wherein the matrix material may be a film-forming material, a thickener, a rheology modifier, an adhesive or an adhesive additive (tackifier). The nanoparticles or dispersions thereof may also be used for their barrier properties, as a carrier, fat replacer or medicament for mitigating dermal disorders. Further examples of applications for the nanoparticles or dispersions thereof are in the paper-making and packaging industry, agriculture and horticulture fields. The nanoparticles can also be used as excipients or carriers in medicines, where they may be complexed or covalently coupled to active substances such as slow-release drugs. The nanoparticles can also be processed into a foam at relatively high density.

Other uses of the nanoparticles of U.S. Pat. No. 6,677,386 can be found in: (i) U.S. Pat. No. 7,160,420 which describes the use of the starch nanoparticles as a wet-end additive in papermaking pulp slurry, or applied to the surface of the paper as a surface sizing agent; (ii) U.S. Pat. No. 6,825,252 which describes the use of the starch nanoparticles in a binder in a pigmented paper coating composition; (iii) U.S. Pat. No. 6,921,430 which describes the use of the starch nanoparticles in environmentally friendly adhesives; and (iv) U.S. Patent Application Publication No. 2004/0241382 which describes the use of the starch nanoparticles in an adhesive for producing corrugated board. The disclosure of these patents and applications, and of all other publications referred to herein, are incorporated by reference as if fully set forth herein.

The invention in U.S. Pat. No. 6,677,386 relates to a process for producing biopolymer nanoparticles which in one form are starch nanoparticles characterized by an average particle size of less than 400 nanometers. The U.S. Pat. No. 6,677,386 does not anticipate, consider nor provide any motivation to use the biopolymer nanoparticles to improve printing performance, as in the current invention, nor does it anticipate performance advantages that might result therefrom.

Thus, it can be seen that the nanoparticles prepared by the process of U.S. Pat. No. 6,677,386 have numerous uses. The application of the biopolymer nanoparticle-based Biolatex™ binders of U.S. Pat. No. 6,677,836 in coated paper and paperboard was recently described in a technical article by Bloembergen et al., entitled "Paper binder performance with biobased nanoparticles. A starch-based biolatex can replace petroleum-based latex binders in papermaking", Paper 360.degree.Magazine, September 2008. The biolatex binder provides a high performance substitute to the petrochemical-based binders used in coated paper and paperboard manufacturing processes at a lower cost per pound. Carboxylated styrene butadiene (SB latex) and styrene acrylate (SA latex) are the dominant petrochemical-based binders used in coated paper and paperboard manufacturing.

Currently, the industry consumes over 4 billion pounds of SB and SA latex per annum. As the price of oil continues to escalate, and as the price of synthetic binders has increased by more than 100% over the past few years, paper producers have faced increased production costs forcing them to find efficiencies, pass increases on to the consumer, or cease production.

The biolatex binder of U.S. Pat. No. 6,677,836 provides performance that is comparable to SB and SA latex for important paper properties such as coating gloss, brightness, whiteness, fluorescence, ink gloss, and printability, while providing superior performance to SB and SA Latex for water retention, opacity, dry pick, print mottle, porosity (blister resistance) and paper stiffness. However, the biopolymer nanoparticles invention of U.S. Pat. No. 6,677,836 do not anticipate, consider nor provide any motivation for use in improved printing performance, as in the current invention, nor does it anticipate the significant performance advantages that result therefrom.

For instance, it is well known in the art that one area of performance deficiency relative to petro-based latex binders is in offset printing applications where water-based fountain solutions in combination with the tacky inks used in commercial 4-color offset printing operations can lead to "wet-picking" damage of the paper coating layer. The inherent challenge in meeting acceptable water-resistance is because the carbohydrate base of the biolatex binder technology is obviously more water-sensitive than the more hydrophobic petro-based binders. However, in other applications such as ink jet and flexographic printing, for example, the ability to attract water into the paper coating can be a major challenge.

Accordingly, a need exists for methods of printing which accommodate this challenge.

SUMMARY OF THE INVENTION

Here, the inventors demonstrate a novel and non-obvious use for the biopolymer nanoparticles compositions such as those described in U.S. Pat. No. 6,677,836 in achieving improved printing performance in applications where the ability to attract water into the paper coating is desirable, such as, for instance, in ink jet and flexographic printing applications.

Other objects, features and advantages of the present invention will become apparent after review of the specification, claims and drawings.

DETAILED DESCRIPTION OF THE INVENTION

The present invention provides a novel and non-obvious use for biolatex compositions in achieving improved printing performance in applications where the ability to attract water into the paper coating is desirable, such as, for instance, in ink jet and flexographic printing applications.

I. In General

Before the present materials and methods are described, it is understood that this invention is not limited to the particular methodology, protocols, materials, and reagents described, as these may vary. It is also to be understood that the terminology used herein is for the purpose of describing particular embodiments only, and is not intended to limit the scope of the present invention which will be limited only by any later-filed nonprovisional applications.

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", and "having" can be used interchangeably.

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are now described. All publications and patents specifically mentioned herein are incorporated by reference for all purposes including describing and disclosing the chemicals, instruments, statistical analysis and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

II. The Invention

The present invention provides a novel and non-obvious use for biopolymer nanoparticle compositions such as those described in U.S. Pat. No. 6,677,386 (which corresponds to WO 00/69916) to Giezen et al., filed Jan. 25, 1999, (the '386 patent) which is hereby incorporated by reference herein.

For purposes of clarity, the "biolatex binders" described throughout represent the pigment and starch dispersions recited in the claims of the '386 patent. For convenience, the trademark symbol® is not used in every instance of Biolatex®. However, we intend that Biolatex® be used as an adjective to describe biopolymer nanoparticles and the novel uses thereof in the present invention. Notwithstanding the foregoing, the methods and uses described herein are not meant to limit the types of biopolymer nanoparticle compositions that can be used in the methods of the current invention.

The invention therefore provides a method of improving print performance in a paper product comprising applying a coating composition comprising (i) a pigment (ii) a synthetic petroleum-derived latex binder such as styrene butadiene (SB) or styrene acrylonitrile (SA) or other common commercial latex binders, (iii) the synthetic petroleum-derived latex binder being partially or completely replaced by Biolatex® binder, wherein the particle size of the crosslinked starch particles predominantly ranges from about 40 nm to about 400 μm, (iv) a cooked starch or modified starch or protein as a cobinder, (v) various coating additives such as an optical brightening agent, rheology modifier/thickener, lubricating agent, biocide, etc., to the paper product, wherein the print performance of the paper product is improved. Among many other property improvements, such as enhanced smoothness, decreased mottle, etc., a key performance improvement is the enhanced print contrast.

In one embodiment, the coating composition comprises a solids content of from 5 to about 75% weight and comprises (i) about 100 parts by weight of pigment, and (ii) about 1 to about 300 parts by weight of starch, all based on dry weight. In other embodiments the coating composition comprises about 10 to about 65% solids, and in other embodiments, the coating composition comprises about 25 to about 50% solids. These different solids ranges typically depend on the coater application equipment and the paper or paperboard coating recipe.

By "starch" we mean a complex carbohydrate polymer which is insoluble in water. It can be in its high molecular weight native form, or in modified form where the molecular weight is typically reduced. A common example is ethylated starches, which contain a certain low level of hydroxyethyl functionalities. Many other modified starches are used, including phosphate, acid-thinned, and thermally modified starches. These modified starches must be cooked prior to use as a cobinder, in order to provide a soluble starch solution. Starch is often found in the fruit, seeds, or tubers of plants. The four major resources for starch production and consumption are corn, potatoes, wheat, and rice. Starch is a mix of two polymeric carbohydrates (polysaccharides) called amylase and amylopectin, in which the monomers are glucose units joined to one another head-to-tail forming alpha-1,4 linkages. The overall structure of amylopectin is not, however, simply a linear polysaccharide chain, since occasionally, two glucose units are joined to one in an alpha-1,6 linkage, forming a branch point. Structurally, the starch forms clusters of linear polymers, where the alpha-1,4 linked chains form linear columns of glucose units branching at the alpha-1,6 links. The relative content of amylose and amylopectin varies between species.

By "pigment" we mean dry or predispersed pigments such as calcium carbonate, clay, titanium dioxide and many other minerals. Coating pigments provide paper and board a smooth and hard surface, which allows high-quality printing to make the product much more appealing.

As discussed above, the biopolymer nanoparticles of the '386 patent have many uses and superior properties in coated paper and paperboard manufacturing applications. However, the inventors have now discovered that the biopolymer nanoparticles of the '386 patent unexpectedly have novel and nonobvious applications improving printed performance in applications where, for example, the ability to attract water into the paper coating can be advantageous.

Biolatex binders adopted in the paper industry in 2008 were the first use of biopolymer-based microgels and nanogels for large-scale industrial applications [van Leeuwen, J., "Paper Coating—SBR Latex Replacement Technology", 2006 TAPPI Coating and Graphic Arts Conference, Atlanta, Ga., April 2006; Klass, C. P., "New Nanoparticle Latex offers Natural Advantage", *Paper360°Magazine*, p. 30-31, January 2007; van Leeuwen, J., "Update on Biopolymer Nanoparticle Latex Development and Applications", 2007 TAPPI Coating and Graphic Arts Conference, Miami, Fla., Apr. 22-25, 2007; Bloembergen et al. "Paper Binder Performance with Nanoparticle Biolatex™: EcoSynthetix develops EcoSphere® biolatex for replacement of petroleum based latex binders", ACFS, Montreal, Jun. 11-13, 2008; Bloembergen et al. "Paper binder performance with biobased nanoparticles. A starch-based biolatex can replace petroleum-based latex binders in papermaking", *Paper360°Magazine*, 46-48, September 2008; Figliolino et al. "Mill Experiences with Biolatex in Brazil", 2009 TAPPI PaperCon Proceedings, Section 19-1, 2009; Figliolino, F. C. and Rosso, F., "Reducing Carbon Footprint with Biolatex", *Paper360°Magazine*, 25-28, Aug. 2009.], although they had been explored and used for drug delivery and other bio-medical applications for a long time [Oh et al. "Biopolymer-based microgels/nanogels for drug delivery applications", *Progress in Polymer Science* 34, 1261-1282, 2009.]. Both biolatex binders and biopolymer-based microgels and nanogels can be broadly defined as a special class of latexes whose particles are made up of water-swollen crosslinked hydrophilic polymers. Since the biolatex binders currently used in the paper industry are water-swollen crosslinked starch nanoparticles, their wet and dry properties depend mainly on their particle size and crosslink density. The crosslink density of starch molecules forming the nanoparticles is especially important because it controls the extent of water swelling (swell ratio), that is, as the crosslink density increases, the swell ratio of crosslinked starch nanoparticles decreases. Varying swell ratios of the water-swollen starch nanoparticles not only set them apart from conventional starches and synthetic latexes in their rheological behavior, but also differentiate themselves in paper coating performance. Their unique rheological behavior and paper coating performance are discussed in [Lee et al. "Development of New Biobased Emulsion Binders", PaperCon2010 Meeting, "Talent, Technology and Transformation", Atlanta, Ga., May 2-5, 2010.], as well as some laboratory testing, pilot coater and mill trial results.

The biolatex binders are manufactured by a continuous reactive extrusion process comprising of solubilizing starch granules, i.e. converting the very high-solids starch paste into a thermoplastic melt phase, and then crosslinking and sizing the solubilized starch molecules into nanoparticles [Giezen et al. U.S. Pat. No. 6,677,386; Bloembergen et al. U.S. patent application Ser. No. 12/377,501]. The resulting product from the extruder is nearly dry agglomerates of crosslinked starch nanoparticles which are subsequently pulverized as a final powder product. The biolatex binders have unique characteristics and properties for paper coatings: their swelling and de-swelling, deformability under shear and pressure and self-lubricating effect for high-speed blade runnability, higher effective solids for improved coating holdout, fiber coverage, and coating smoothness, and less shrinkage for high coating gloss (uncalendered), porosity, and opacity. These unique characteristics were found to be attributed to the fact that biolatex binders are made up of water-swollen crosslinked nanoparticles having varying degrees of water swelling (SR) and tend to shrink less upon coating consolidation during drying. Synthetic binders such as SB and SA do not possess these characteristics.

For instance, in applications including without limitation ink jet and flexographic printing, it is well known that current synthetic binders lack performance in this area for both "coated" and "uncoated" paper applications.

Figure 1:
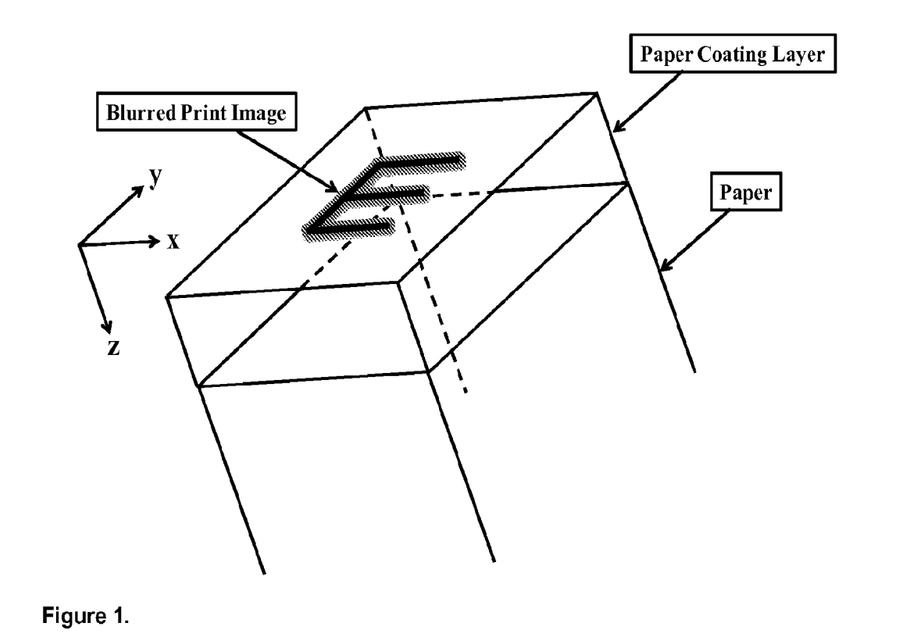
FIG. 1. Print image on a coated or "uncoated" paper or paperboard product in which the image is blurred due to ink migration primarily in the x and y directions.

By "uncoated" paper, we mean a paper product produced with only a very thin coating applied primarily for print performance, such that that product appears similar to uncoated paper. In these coated and "uncoated" paper applications, when water based inks are printed on the surface, the printed image may lose quality as it is blurred due to migration of the inks in x and y directions (FIG. 1). This becomes very important for commercial ultra-high speed and high quality ink jet and flexographic printing operations.

Figure 2:
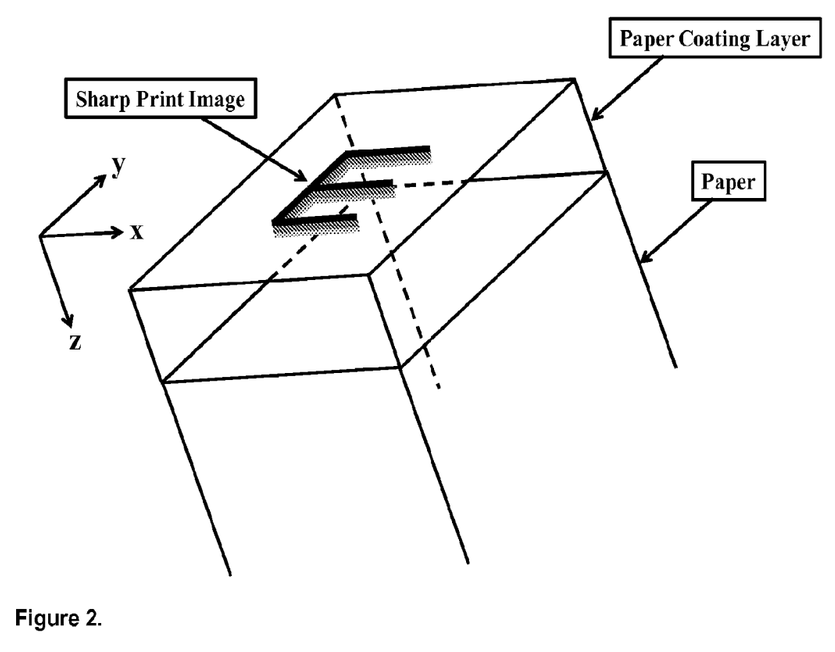
FIG. 2. Print image on a coated or "uncoated" paper or paperboard product in which the image is sharp due to ink migration primarily in the z direction.

Accordingly, the inventors have now discovered that, if instead of petro-based latex binders, the novel biolatex binders of, for instance, the '386 patent are used in the coated paper or paperboard product, improved print performance will result. By "improved" we mean, for example, that migration of the ink will be primarily in the z direction (FIG. 2). By using the biolatex binders to force ink migration in the z-direction, the inventors have made the novel and non-obvious discovery that migration of water-based inks in the z direction, i.e. into the paper coating and paper backing, will result in improved printing performance by exhibiting, for instance, higher contrast printed images. The promotion of water-based inks in the z direction will occur as a result of the porous structure of the biopolymer nanoparticles, which consist of ultra high surface biolatex particles containing a nanocellular foam-like morphology capable of rapidly absorbing water migration from water based inks.

Figure 3:
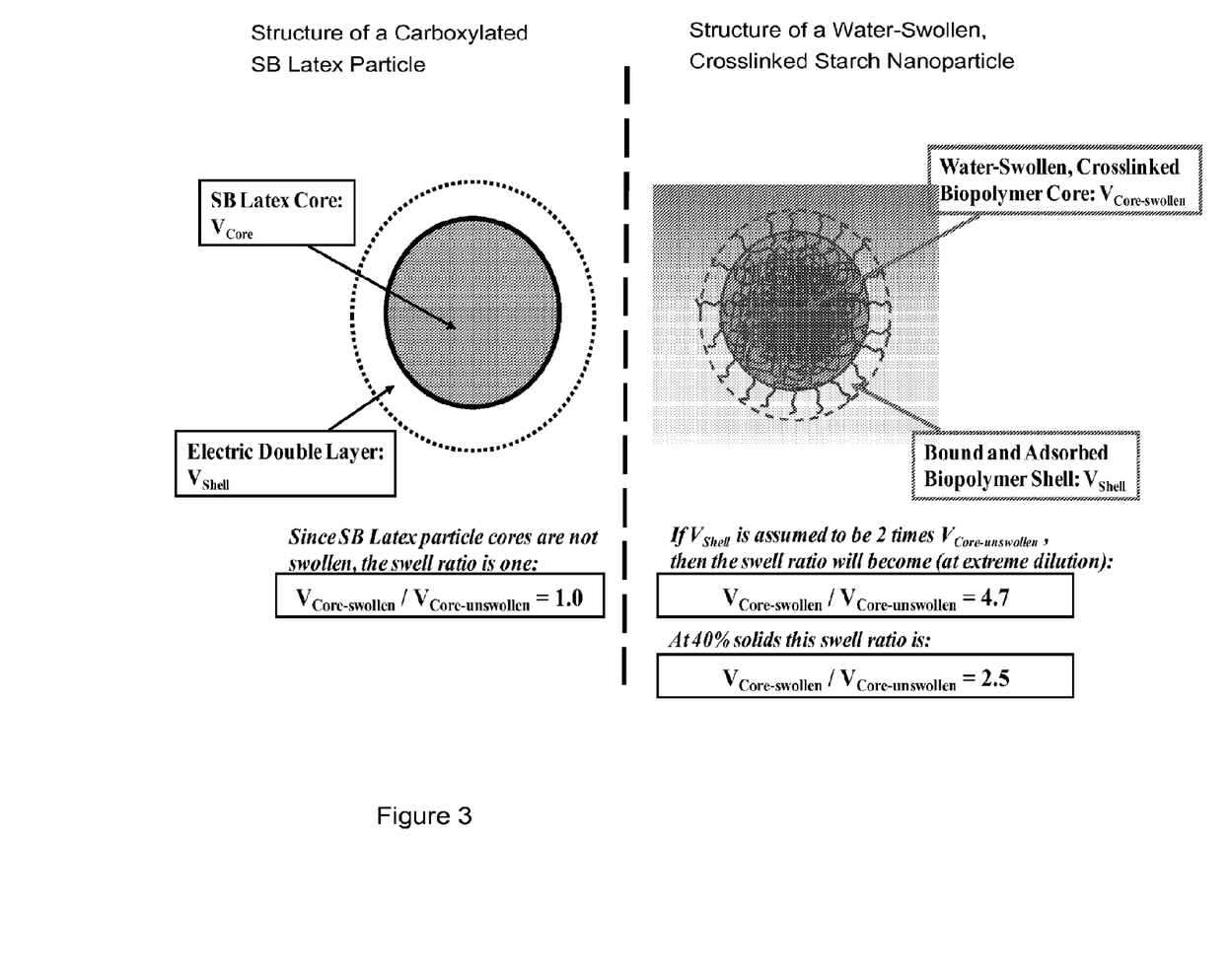
FIG. 3. Swelling and de-swelling behavior of water-swollen crosslinked starch nanoparticles with increasing solids.

As noted above, the carbohydrate-based biolatex binder of, for instance, the '386 patent is more water-sensitive than the more hydrophobic petro-based binders (FIG. 3). Crosslinked hydrophilic nanoparticles have very unique properties. First, their swelling under the extreme dilution with water achieves the maximum swelling value that is balanced between their elastic constraint due to their crosslinked network and the osmotic pressure.

Figure 4:
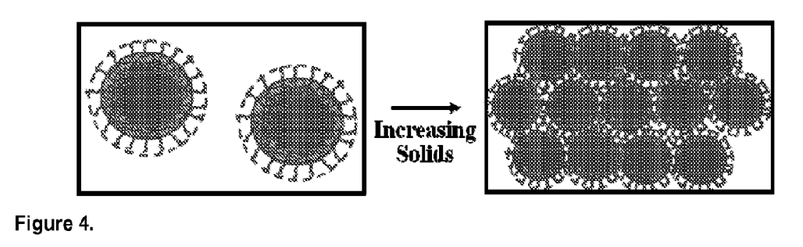
FIG. 4. De-swelling of water-swollen crosslinked starch nanoparticles with increasing solids.

Secondly, they de-swell by addition of water-miscible solvents such as alcohols and many other water-soluble species such as electrolytes. Lastly, they will also de-swell with increasing solids so that their dispersions can be made at higher solids, as shown in FIG. 4.

This behavior can be understood by the fact that the concentration of starch networks in the particles cannot be lower than the overall dispersion concentration. Therefore, de-swelling will take place, when the concentration of dispersions exceeds that of the starch network in the particles, which is equal to the reciprocal of the swell ratio (SR) by weight, $[1/SR(W)]$.

The performance of the biobased latex "biolatex binder" can be explained in the context of the drying process of water swollen crosslinked biopolymer nanoparticles [Bloembergen et al. "Specialty Biobased Monomers and Emulsion Polymers Derived from Starch", PTS Advanced Coating Fundamentals Symposium, Munich, Oct. 11-14, 2010; Bloembergen et al. "Ongoing Developments in Biolatex Binders with a Very Low Carbon Footprint for Paper and Board Manufacturing", 64th *Appita Annual Conference & Exhibition*, Melbourne, Australia, Apr. 19-21, 2010; Bloembergen et al. "Paper Binder Performance with Nanoparticle Biolatex", ACFS, Montreal, Jun. 11-13, 2008; Bloembergen et al.

"Paper binder performance with biobased nanoparticles. A starch-based biolatex can replace petroleum-based latex binders in papermaking", *Paper 360°Magazine*, p. 46-48, September 2008; and Lee et al. "Development of New Biobased Emulsion Binders", PaperCon2010 Meeting, "Talent, Technology and Transformation", Atlanta, Ga., May 2-5, 2010.].

Conventional commercial starch binders which must be cooked and pasted to form a solution, lead to poor optical properties due to well-established inherent shrinkage properties of starches. Shrinkage leads to rougher paper coating surfaces which reduce critical optical properties such as gloss.

Figure 5:
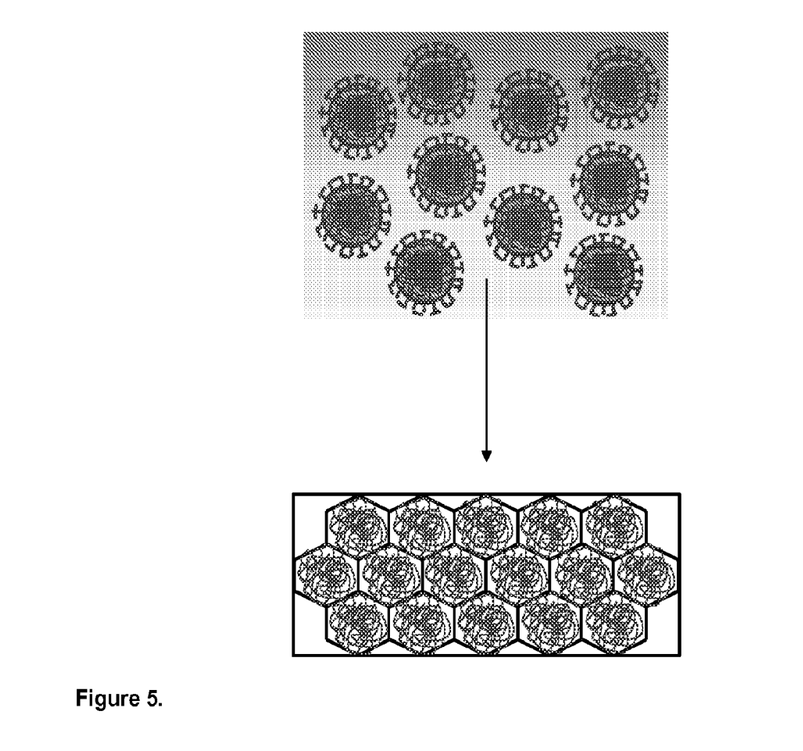
FIG. 5. Structure of the biobased colloid particle as it transitions from a wet latex dispersion to a dried film, illustrating the nano-cellular void morphology.

Petroleum-based binders such as SB and SA Latex are not subject to significant shrinkage upon drying, and are known to deliver good optical properties such as gloss. Coated paper and paperboard production in pilot plant and commercial mill operations has established that the biolatex binder yields similar results. This is because the crosslinked starch nanoparticles that make up the biolatex binder maintain much of their swollen or expanded structures upon drying, due to the creation of a nano-cellular or "foam like" morphology upon drying, as illustrated in FIG. 5.

As noted above, migration of water based inks in the z direction, i.e. into the paper coating and paper backing, will result in higher contrast printed images. The promotion of water based inks in the z direction will occur as a result of the porous structure of the biopolymer nanoparticles, which consist of ultra high surface biolatex particles containing a nano-cellular foam-like morphology capable of rapidly absorbing water migration from water based inks.

Other embodiments and uses of the invention will be apparent to those skilled in the art from consideration from the specification and practice of the invention disclosed herein. All references cited herein for any reason, including all journal citations and U.S./foreign patents and patent applications, are specifically and entirely incorporated herein by reference.

It is understood that the invention is not confined to the specific reagents, formulations, reaction conditions, etc., herein illustrated and described, but embraces such modified forms thereof as come within the scope of the following claims.

What is claimed is:

1. A method of making printed paper comprising steps of:
    a) providing a paper substrate comprising a coating, wherein the coating comprises a dried latex, the latex comprising crosslinked, solubilized biopolymer nanoparticles; wherein the paper substrate appears similar to uncoated paper; and
    b) printing a water-based ink on the coated surface with an ink jet printer.

2. The method of claim 1, wherein the biopolymer nanoparticles comprise crosslinked, solubilized starch particles.

3. The method of claim 1, wherein the coating further comprises a cooked starch or modified starch or protein as a co-binder.

4. The method of claim 1, wherein the coating further comprises an additive selected from the group consisting of: a dye, a pigment, an optical brightening agent, a thickener, a lubricating agent, and a biocide.

5. The method of claim 1, wherein the coating further comprises petroleum-derived latex forming particles.

6. The method of claim 1, wherein the coating further comprises a pigment.

7. The method of claim 6, wherein the coating comprises 100 parts by weight of the pigment and about 1 to about 300 parts by weight of starch.

8. The method of claim 1, wherein step a) comprises applying the coating to the paper substrate at a solids content from about 5% total weight to about 75% total weight.

* * * * *